Figure 1:
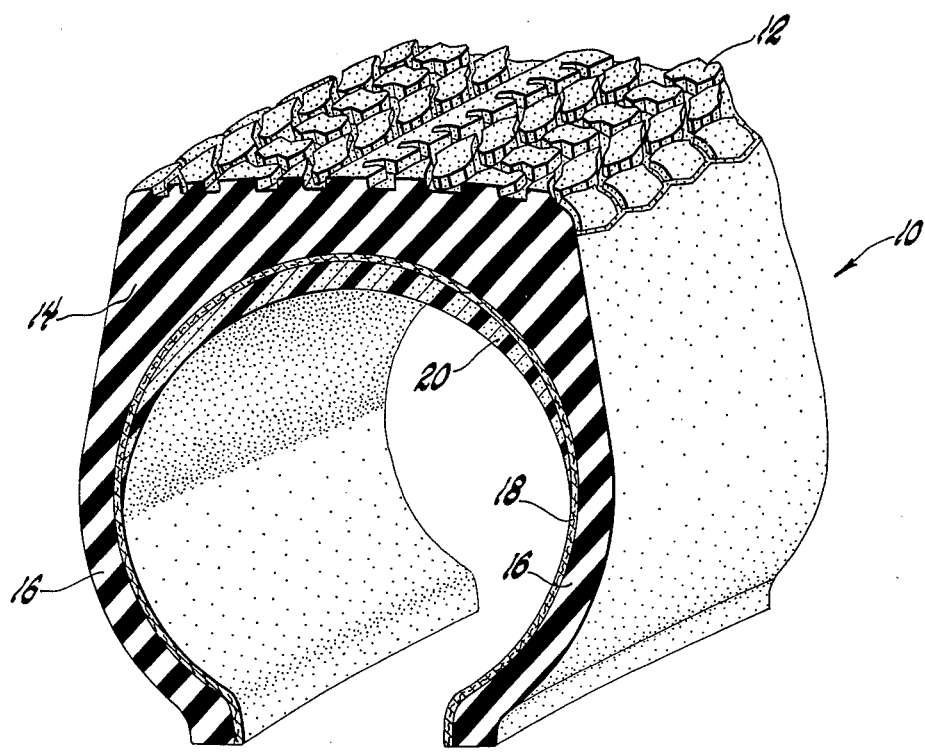

United States Patent

Stang et al.

[11] 3,935,893
[45] Feb. 3, 1976

[54] SELF-SEALING VEHICLE TIRE AND SEALANT COMPOSITION

[75] Inventors: Peter L. Stang, Bellevue; Joel V. Van Ornum, Kirkland, both of Wash.

[73] Assignee: General Motors Corporation, Detroit, Mich.

[22] Filed: July 15, 1974

[21] Appl. No.: 488,563

[52] U.S. Cl. .................. 152/347; 156/115; 428/912; 260/33.6 AQ; 260/42.32; 260/42.47; 260/876 B; 260/880 B
[51] Int. Cl.² ...... B60C 5/14; B60C 17/00; C08K/5/01
[58] Field of Search ........ 260/33.6 AQ, 260/42.32, 260/876 B, 880 B; 220/63 A; 152/346, 347; 161/405; 156/115

[56] References Cited
UNITED STATES PATENTS

| | | | |
|---|---|---|---|
| 2,765,018 | 10/1956 | Connell............................. | 156/115 |
| 2,818,902 | 1/1958 | Schutz............................... | 161/405 |
| 3,485,787 | 12/1969 | Haefele et al................... | 260/880 B |

OTHER PUBLICATIONS

*Rubber World* —*Materials & Compounding Ingredients for Rubber* (Bill Publications) (N.Y.) (1968), p. 230.

*Primary Examiner*—Donald E. Czaja
*Assistant Examiner*—H. H. Fletcher
*Attorney, Agent, or Firm*—George A. Grove

[57] ABSTRACT

A vehicle tire is disclosed having an internal circumferential layer of self-sealing composition on an internal surface, particularly behind the tire tread. The sealant layer is initially made up of the combination of specific quantities of a high molecular weight curable butyl rubber, a low molecular weight curable butyl rubber, a liquid polybutylene tackifier, a partially hydrogenated block copolymer of styrene and a conjugated diene, carbon black and suitable curing agents for the butyl rubber components. When cured, this sealant layer effectively heals most punctures one-quarter inch in diameter or less in a vehicle tire at temperatures over the range of about $-20°$ F. to $270°$ F. without significant loss of air.

4 Claims, 2 Drawing Figures

U.S. Patent   February 3, 1976   3,935,893

SELF-SEALING VEHICLE TIRE AND SEALANT COMPOSITION

This invention relates to tubeless rubber tires constructed so as to be self-sealing with respect to small puncture holes. More particularly, this invention relates to a tire sealant composition for use on an internal surface of an automotive rubber tire which is capable of self-sealing puncture holes in the tread region when the tire is in use and at a temperature in the range of about −20° F. to 270° F.

Considerable effort has been expended to develop a rubber tire for automotive applications which is capable of self-healing puncture wounds while in operation. U.S. Pat. Nos. 2,756,801, 2,765,018 and 2,782,829 disclose different approaches to this problem. The development of an effective self-sealing tire is very difficult because the operating tire may experience temperatures over a very wide range. Tires on vehicles standing outside in the wintertime may experience temperatures of −20° F. or lower. On the other hand, the tires of a vehicle traveling for prolonged periods in summer weather at highway speeds may reach temperatures of 220° F. or higher. To be effective, the sealant portion of such a tire must be sufficiently tacky to stick to a puncturing object, or to itself if the puncturing object is removed, and have sufficient strength to seal the hole at any temperature in this broad range. Furthermore, the sealant must resist oxidative or thermal degradation when subjected to the air, which may become quite hot, filling the tire. None of the prior art compositions and approaches directed to self-sealing tires, that we are aware of, are effective under all of these conditions. Furthermore, in our experience, no currently available sealants effectively perform as a self-healing composition in vehicle tires under all the conditions that a tire can be expected to encounter.

Accordingly, it is an object of the present invention to provide a vehicle tire construction incorporating an inner circumferential layer of sealant composition that is effective to seal puncture holes up to about one-quarter inch or so in diameter when the tire is at a temperature in the range of below zero Fahrenheit to about 270° F. The multicomponent composition of the sealant layer has the ability to immediately heal a newly formed puncture hole at a temperature in this wide range and sufficient strength to prevent significant loss of air pressure.

It is another object of the present invention to provide a tire sealant composition suitable upon curing for use in a conventional rubber tire. The composition is a specific combination of several ingredients which cooperate to provide the self-healing properties and the strength properties required for this demanding application.

In accordance with a preferred embodiment of our invention, these and other objects and advantages are accomplished by providing a circumferential layer of cured sealant composition on an internal surface of a vehicle tire, particularly in the region behind the tread stock. The sealant layer is formed by initially mixing specific quantities of a relatively high molecular weight curable polyisobutyleneisoprene copolymer, a relatively low molecular weight curable polyisobutyleneisoprene copolymer rubber, a liquid polybutylene tackifier, a partially hydrogenated block copolymer of styrene and isoprene, carbon black and a crosslinker and initiator to cure the butyl rubber components. For example, a preferred sealant may be prepared by initially mixing 15 parts by weight of a curable polyisobutylene-based copolymer having an average molecular weight in the range of about 100,000 to 300,000; 10 parts by weight of a curable polyisobutylene-based copolymer having an average molecular weight in the range of about 10,000 to 30,000; 65 parts by weight of a liquid polybutylene having an average molecular weight of about 500 to 5,000; 10 parts by weight carbon black; and 5 parts by weight of a partially hydrogenated block copolymer of the A-B-A configuration wherein prior to hydrogenation each A is a polystyrene block and B is substantially a polyisoprene block, the total molecular weight of the block copolymer being about 100,000 and the polyisoprene making up about two-thirds by weight of the block copolymer.

A suitable solvent, such as toluene, for the polymeric components may be employed to assist in the mixing and handling of the composition. A small amount of a crosslinking agent, such as para-quinone dioxime, and a crosslinking initiator, such as benzoyl peroxide, are employed to cure the two polyisobutylene copolymer components.

Where it is desired to apply a sealant layer of the subject composition to a preformed tire, a toluene dispersion of the uncured composition may be sprayed onto the inside surface of the tire. For example, about 200 grams (on a solvent-free basis) of the above composition containing crosslinkers in air sprayed into a steel belted JR-78-15 tire preheated to 125° F. The composition gels in about 2 to 5 minutes. The tire is then allowed to set at ambient temperature for one-half hour to allow for evaporation of excess toluene and then placed in an oven at 125° F. for an additional one-half hour to preheat the tire for spraying of the second coat of sealant. This procedure is repeated after the second coat. Upon completion of the application of the third coat, the tire is again allowed to stand at room temperature for one-half hour and then placed in an oven at 125° F. for sixteen hours for final curing. The thus formed sealant layer remains in its place in the tire despite normal usage thereof. Furthermore, it has the ability to fill and seal a puncture hole formed in the tire even at high speed and high temperature tire operation.

Figure 2:
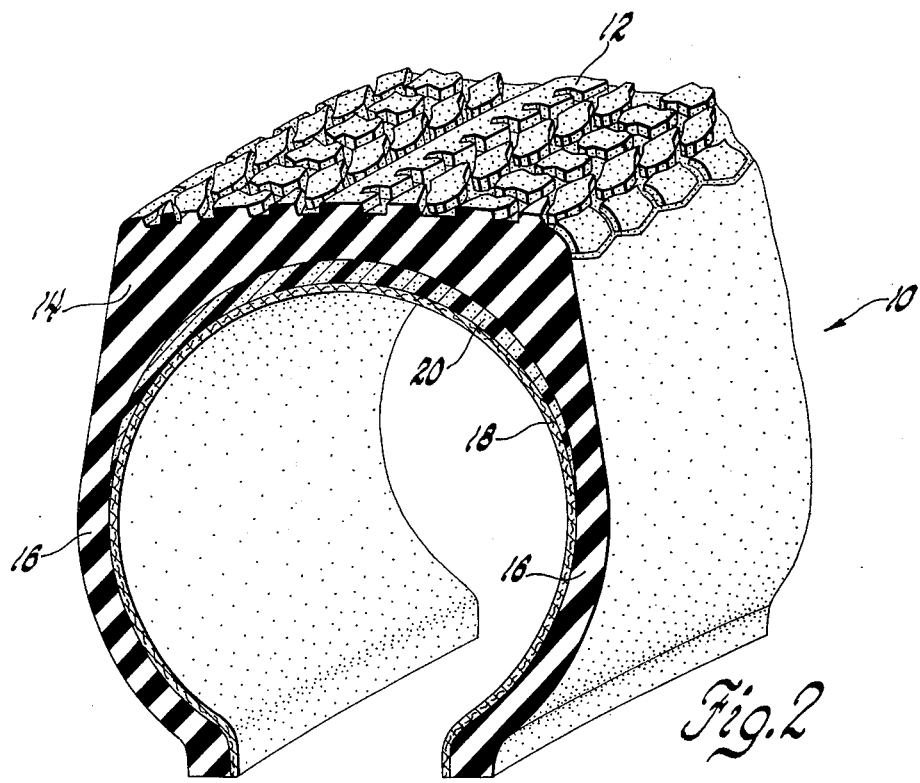

Other advantages of our invention will become more apparent from a detailed description thereof which follows. Reference will be made to the drawings, in which:

FIG. 1 is a perspective view of a tire broken away to show the cross-sectional structure thereof and to display one embodiment of the invention in which the sealant layer is located on the innermost surface of the tire behind the tread; and FIG. 2 is a perspective view of a tire broken away to show the cross-sectional structure of the tire and depicting another embodiment of the invention in which the subject sealing layer is located behind the tread and between an air impervious film conventionally employed in the tire and the carcass portion of the tire.

In FIG. 1 is depicted a tubeless tire 10 which comprises the tread portion 12, carcass 14, and side walls 16. In tubeless tires it is generally desirable to employ a barrier layer or lining 18 which is impermeable to air. The air impermeable lining 18 extends typically over the entire inner surface of the tire from one bead portion to the other bead portion. In accordance with one embodiment of our invention a sealing layer 20 is placed on the inside of the tire against the air barrier layer 18. The sealant layer 20 is arranged and constructed to lie principally behind the tread of the tire because it is contemplated that the sealing layer will serve principally to seal punctures coming through the tread portion of the tire.

FIG. 2 depicts a tubeless tire 10 having parts similar to those depicted in FIG. 1 (and identified by like numerals), except that in this embodiment of our invention the sealing layer 20 is located between the carcass 14 of the tire and the air impermeable barrier layer 20.

In general, it is preferred that our sealant layer be formed and cured at the time the tire is being manufactured. Production economies can be realized, including the fact that the subject sealant layer can be cured at the higher temperatures (about 350° F.) employed in curing the other tire rubber compositions. When this is done it is possible to locate the sealant layer either between the carcass 14 of the tire 10 and the air impermeable barrier layer 18 as shown in FIG. 2, or inside the air impermeable layer 18 as shown in FIG. 1. However, if the sealant layer is applied after the tire is manufactured, of course, it is only possible to place such layer inside the air impermeable barrier as shown in FIG. 1.

Our sealant layer 20 is a tacky, carbon-filled rubber material formed by curing a compound mixture of a high molecular weight and a low molecular weight butyl rubber. Incorporated with these rubber materials prior to curing is a tackifier and a thermoplastic elastomer block copolymer, preferably of polystyrene and polyisoprene, which significantly contributes to the strength and sealing capability of our sealing layer.

A better appreciation of our invention will be gained through specific examples which illustrate how the sealing composition is compounded, cured, applied and evaluated.

EXAMPLE 1

The screening of a number of commercial sealants had indicated that a curable butyl rubber sealant would be compatible with the rubber tires and might afford a good starting place for a self-sealing tire composition. However, the butyl rubber-based sealant by itself did not have sufficient strength at high temperatures nor sufficient tack to serve as a tire sealant composition.

A commercially available sealant composition was obtained having the following compositions.

| Ingredients | Parts by Weight |
| --- | --- |
| High molecular weight, curable butyl rubber | 60 |
| Low molecular weight, curable butyl rubber | 40 |
| HAF carbon black | 50 |
| SRF carbon black | 25 |
| MT carbon black | 25 |
| Tung oil | 5 |
| Toluene | 483.5 |
| Para-quinone dioxime | 2.5 |

The high molecular weight butyl rubber was a copolymer of 96% isobutylene and 4% isoprene. The average molecular weight of the polymer was in the range of 100,000 to 300,000. The low molecular weight butyl rubber was likewise a copolymer of 96% isobutylene and 4% isoprene. However, the molecular weight of this butyl rubber was in the range of 10,000 to 30,000.

These two butyl rubber components are curable because of the residual unsaturation provided by the small isoprene content. The carbon black filler contributes strength to the sealant. The tung oil component is a processing additive. Toluene is a solvent for the uncured butyl rubber components. The paraquinone dioxime is a crosslinking agent which has to be oxidized to para-dinitroso benzene with a suitable oxidant, such as lead dioxide or benzoyl peroxide, to initiate curing.

In making up the subject sealant, 35 parts by weight of the above commercial composition (on a solvent-free basis) was mixed with 60 parts by weight of a liquid polybutylene-based tackifier and 5 parts by weight of a partially hydrogenated block copolymer of styrene and isoprene, and the para-quinone dioxime was added. In this case an additional 1.5 parts of para-quinone dioxime per 100 parts of butyl rubber constituents were added. This made a total of 4 parts of the dioxime per 100 parts curable rubber. The additional dioxime crosslinker was employed to increase the crosslink density of the cured rubber and provide greater strength. These constituents were all dissolved or suspended in the toluene solvent.

The liquid tackifier was actually a copolymer of 98% butylene and 2% isobutylene. It had an average molecular weight in the range of 500 to 5,000. It was a commercial product available under the trade name "Indopol H-300".

The block copolymer employed was of the A-B-A type wherein the A blocks were formed of polystyrene, the B blocks were polymeric segments of isoprene and some higher carbon chain length conjugated dienes. The block copolymer employed in the sealant of this example had an average molecular weight of about 100,000 and was made up of about 68% by weight polyisoprene. The block copolymer had been hydrogenated so that the polyisoprene segments were almost completely saturated. However, the polystyrene segments were not hydrogenated to any significant extent. The specific material used in this example was obtained under the trade designation "Kraton G-6500". Block copolymers of this type are described in U.S. Pat. No. 3,595,942.

New Uniroyal JR-78-15 steel belted radial tires were obtained to evaluate the subject sealant composition. It was noted that the tires had residual mold release agent on their internal surfaces. To remove the mold release agent, the tires were first counted on a rotator and then one-half gallon of a soap solution containing a 50 milliliter cup of Amway SA-8 soap powder was added to a tire. A steel rotary brush on a flexible cable was then used to brush the tire with the soap solution while the tire was rotating. The tire was then thoroughly rinsed out with tap water. The rinse water was then removed, followed by a vacuuming step to remove the remaining water. The tire was then dried at ambient prior to coating.

A tire was then preheated to 125° F. A quantity of the subject sealant composition prepared as described above was provided. Ten parts of benzoyl peroxide per 100 parts of total curable butyl rubber constituents present were added to the mixture and thoroughly mixed therewith. The sealant composition dispersed in toluene was then sprayed onto the inner surface of a cleaned and preheated tire employing commercial air paint spray equipment. A pressure feed was employed and the sealant was sprayed using 50 psig compressed air, however, an airless spray system could also be used.

The tire was rotated as the sealant was sprayed onto the internal surface and directed to the region behind the tread, as indicated at 20 in FIG. 1. Two hundred grams (on a solvent-free basis) of the subject sealant composition were applied. Some of the solvent evaporated during spraying and the applied composition gelled in the tire in about five minutes. The tire was then left at ambient temperature for a minimum of one-half hour to evaporate excess solvent and cure the sealant layer. One-half hour prior to the second coating the tire was placed in an oven at 125° F.

The tire was removed from the oven and, while still warm, a second 200 gram layer (on a solvent-free basis) of sealant composition identical to that described was applied. Much of the toluene solvent evaporated upon spraying and the second layer was observed to quickly gel. The tire was set aside for one-half hour to allow much of the toluene to evaporate and returned to the oven for an additional one-half hour. The tire was then removed from the oven and a third 200 gram coating (solvent-free basis) was applied. The tire was returned to the oven as before and the third sealant layer cured at 125° F. overnight.

The tire was then mounted on a wheel and inflated with air to 30 psig. The wheel was rotated and the tire was punctured with 0.200 and 0.250 inch diameter spikes at temperatures of −20° F., ambient, and 270° F., and the spikes were removed. After puncturing at each temperature, each puncture was squirted with a commercial soapy leak detector called "Snoop" to observe if any leakage took place. In each instance the tire sealed itself without any significant leakage of air.

EXAMPLE 2

A second sealant composition was prepared. It was made up by mixing together 14.25 parts by weight of a curable high molecular weight butyl rubber having an average molecular weight in the range of 100,000 to 300,000, 9.5 parts by weight of a curable butyl rubber having a molecular weight in the range of 10,000 to 30,000, 62 parts by weight of the polybutylene liquid tackifier, 9.5 parts by weight of an industrial carbon black, a furnace black with a surface area of 235 sq. meters/gm and a pH of 9.0, 4.75 parts by weight of a partially hydrogenated block copolymer of polystyrene and polyisoprene, and 2.5 parts by weight para-quinone dioxime per 100 parts total curable butyl rubber constituents. This mixture was dissolved in and suspended in 90 parts by weight of toluene. Just prior to usage, 10 parts by weight of benzoyl peroxide per 100 parts of butyl rubber components were dissolved in 60 parts of toluene and added to the curable rubber composition.

A number of Uniroyal JR-78-15 tires were cleaned with a soap-sodium metasilicate cleaning solution as described in Example 1. The tires were preheated to 125° F. and each coated with three 200 gram layers (solvent-free basis) of the subject composition. Each layer was observed to gel within a period of a couple of minutes. After the application of the third layer the tire was then set aside for one hour to allow for most of the toluene to evaporate at ambient and then placed in the oven at 125° F., wherein solvent was evaporated and the sealing composition was cured over a sixteen hour period. The tires were then mounted on wheels and tested with nail punctures through the tread at temperatures from −20° F., ambient, and 270° F. as described in Example 1. In each instance the sealant healed the puncture hole without significant loss of air. It has been noted that the healing occurs in the following manner. The sealant adheres to the nail when the nail is in the tire, and this sealant adhering to the nail is pulled into the puncture hole if the nail is removed. Air pressure helps to force sealant to the nail and also into the puncture hole. When a tire has been punctured and self-healed in accordance with the subject invention and then removed from its wheel and examined from the inside, it is usually very difficult to locate the puncture. The sealant is drawn or forced into the hole to very effectively heal it.

It has been found that the subject sealant composition must be formulated to contain certain specific constituents within narrow and definite composition ranges. The difficulty lies in providing a composition which has the ability to both re-heal any cut in the sealant caused by a puncture and seal a puncture hole at a temperature anywhere in the range from about −20° F. to 270° F. Once the hole has been filled (which must occur very rapidly), it is then necessary for the sealant to have sufficient strength to maintain air under pressures up to 30 to 40 psig and higher while the tire is continually being flexed and stressed as it is in normal vehicle use. While the subject sealant has been tested and found effective at temperatures up to 270° F. it is usually felt automotive tires in normal usage will not experience temperatures above about 220° F.

The sealant composition is made up according to the following specification. Two curable butyl rubber components — one a relatively high molecular weight constituent and the other a relatively low molecular weight constituent — are employed in combination. Ten to fifteen parts of a polyisobutylene-based copolymer (preferably about 96% isobutylene — 4% isoprene) having an average molecular weight in the range of about 100,000 to 300,000 is employed in combination with 6 to 10 parts of a copolymer of 96% polyisobutylene and 4% isoprene, having an average molecular weight in the range of about 10,000 to 30,000. Mixed with the curable butyl rubber constituents are 60 to 65 parts by weight of a liquid polybutylene (e.g., 98% butylene - 2% isobutylene) tackifier having an average molecular weight in the range of 500 to 5,000. This liquid saturated $C_4$ polymer represents a major part of the total composition. It appears to be unique in its thermal stability and its contribution of stickiness and flowability over the wide temperature range in which the subject sealant must serve.

The other polymeric constituent of the subject sealant composition is a thermoplastic, elastomeric, hydrogenated block copolymer having the general configuration $A-(B-A)_{1-5}$. Four to ten parts of this hydrogenated block copolymer are employed in combination with the other constituents. If more than about 10% of the block copolymer is employed in the subject sealant (solvent-free and curing agent-free basis) the composition will not adequately self-heal. If the block copolymer content is less than 4% (on the same basis) the sealant does not have adequate strength, particularly at high temperatures.

Prior to hydrogenation each A (of the A-(B-A) block copolymer) is a thermoplastic monovinyl arene polymer block and each B is a conjugated diene polymer block. In accordance with our invention the monovinyl arene is preferably styrene, but may also be alpha methyl styrene, ring alkylated styrenes and the like as well as mixtures thereof. Furthermore, in accordance with our invention the B block(s) may be prepared from conjugated dienes having from 4 to 10 carbon atoms, but preferably 4, 5 or more carbon atoms per monomer molecule, including specifically isoprene. The elastomer polymerized conjugated diene component of the block copolymer typically makes up in total about two-thirds or more of the block copolymer with the thermoplastic polymer constituent making up the end groups and the balance of the copolymer. In accordance with our invention the average molecular weight of this block copolymer is suitably in the range of about 60,000 to 400,000 and preferably in the range of about 70,000 to 150,000. The composition is partially hydrogenated so that the conjugated diene block segment(s) are substantially fully saturated. However, the polystyrene segments are not appreciably hydrogenated. Copolymers which are not hydrogenated in this fashion are not suitably resistant to oxidation and degradation at the high temperature end of the operating environment of the tire, particularly considering that there is considerable oxygen in the tire.

Although the polystyrene-polydiene-polystryene block copolymer constituent is employed in relatively small amounts, we have found that it is absolutely essential that it be employed in the subject sealant composition if the sealant is to have suitable strength, particularly over the wide temperature range involved, to effectively retain the air under pressure in a punctured tire.

Carbon black filler in the amount of 5 to 17 parts by weight is also incorporated into the composition. A furnace black having a high surface area and a basic pH is preferred.

A solvent, such as toluene, for the polymeric components may be employed in the preparation and application of the sealant composition.

Also incorporated in the composition is a suitable crosslinker for the butyl rubber constituents. The preferred crosslinker for the butyl rubber constituents is para-quinone dioxime. However, other well known butyl rubber curing agents may be employed. At the time the curing is to take place it is also necessary to incorporate an oxidative initiator, such as benzoyl peroxide, to convert para-quinone dioxime to its crosslinking form, para-dinitroso benzene. Para-quinone dioxime and benzoyl peroxide are prefered for use in combination in the practice of our invention because they promote rapid gel times.

The embodiments of the invention described in the specific examples involved spraying the subject sealing composition into tires that had already been manufactured. In another embodiment the sealant composition is formed and cured in the form of sheets and applied to the inside of the tire, as desired, employing a suitable adhesive. However, in many instances it will be preferred to form and cure the sealant layer at the same time the tire is being manufactured. One practice would be to first lay up the butyl rubber-based inner liner. An uncured sealing layer of the subject composition would then be placed on the inner liner member. Then the uncured carcass portion of the tire, including its layers of reinforcing belting and the like, would be formed after the sealing layer had been laid up. Subsequently, the tread stock would be laid on the uncured carcass. The whole tire would then be cured at normal curing temperatures of the order of 350° F., at which temperature the curing of the subject healing composition would be greatly accelerated and comparable in time to the curing of the other portions of the tire.

When the butyl rubber portion of the subject sealant layer is cured at this high temperature, some modifications may be required in the type and amount of crosslinker and initiator employed as compared with the above examples.

Prior to the discovery of the subject composition a number of other known sealant and elastomeric materials were tested and evaluated as self-healing tire sealants. For example, other butyl rubber-containing compositions were tried but failed to be self-sealing over the wide temperature ranges involved. Also, ethylene-vinyl acetate copolymers were tested and found lacking. Urethane rubbers were also evaluated and it was found that they would not satisfactorily seal puncture holes over the wide temperature ranges involved. We have also found, as indicated above, that even when employing the specific constituents described as elements of the subject composition, a wide variation in their compositional ranges cannot be tolerated and still obtain the benefits of the subject invention.

While our invention has been described in terms of a few specific embodiments thereof, it will be appreciated that other forms could be adapted by one skilled in the art and, accordingly, our invention is to be considered limited only by the scope of the following claims.

What is claimed is:

1. A sealant composition for use in a vehicle tire to seal punctures therein up to about one-quarter inch in diameter formed in the operation of said tire, said composition consisting essentially of, by weight,
  10 to 15 parts of a butyl rubber having an average molecular weight in the range of about 100,000 to 300,000,
  6 to 10 parts of a butyl rubber having an average molecular weight in the range of about 10,000 to 30,000,
  60 to 65 parts of a liquid polybutylene having an average molecular weight of about 500 to 5,000,
  5 parts of a partially hydrogenated thermoplastic elastomeric block copolymer having the general molecular configuration $A-(B-A)_{1-5}$ wherein, prior to hydrogenation, each A is a monovinyl arene polymer block and each B is a conjugated diene polymer block, and only said diene block(s) are hydrogenated,
  5 to 17 parts carbon black,
  and small but suitable amounts of crosslinking agents suitable for curing butyl rubbers.

2. A sealant composition for use in a vehicle tire to seal punctures therein up to about one-quarter inch in diameter formed in the operation of said tire, said composition consisting essentially of, by weight,
  10 to 15 parts of a butyl rubber having an average molecular weight in the range of about 100,000 to 300,000,
  6 to 10 parts of a butyl rubber having an average molecular weight in the range of about 10,000 to 30,000,
  60 to 65 parts of a liquid polybutylene having an average molecular weight of about 500 to 5,000,
  5 parts of a partially hydrogenated thermoplastic elastomeric block copolymer having the general molecular configuration $A-(B-A)_{1-5}$ wherein, prior to hydrogenation, each A is a styrene polymer block and each B is a conjugated diene polymer block of a diene taken from the group consisting of butadiene and isoprene, and only said diene block(s) are hydrogenated, said copolymer having a molecular weight in the range of about 70,000 to 150,000, 5 to 17 parts carbon black, and small but suitable amounts of crosslinking agents suitable for curing butyl rubbers.

3. A self-sealing rubber tire comprising a tread portion, a carcass portion and a self-sealing layer inside of said carcass portion, said self-sealing layer consisting essentially of, by weight, a cured composition formed from:

10 to 15 parts of a butyl rubber having an average molecular weight in the range of about 100,000 to 300,000, 6 to 10 parts of a butyl rubber having an average molecular weight in the range of about 10,000 to 30,000, 60 to 65 parts of a liquid polybutylene having an average molecular weight of about 500 to 5,000, 5 parts of a partially hydrogenated thermoplastic elastomeric block copolymer having the general molecular configuration $A\text{-}(B\text{-}A)_{1-5}$ wherein, prior to hydrogenation, each A is a monovinyl arene polymer block and each B is a conjugated diene polymer block, and only said diene block(s) are hydrogenated, and 5 to 17 parts carbon black.

4. A self-sealing rubber tire comprising a tread portion, a carcass portion and a self-sealing layer inside of said carcass portion, said self-sealing layer consisting essentially of, by weight, a cured composition formed from:

10 to 15 parts of a butyl rubber having an average molecular weight in the range of about 100,000 to 300,000, 6 to 10 parts of a butyl rubber having an average molecular weight in the range of about 10,000 to 30,000, 60 to 65 parts of a liquid polybutylene having an average molecular weight of about 500 to 5,000, 5 parts of a partially hydrogenated thermoplastic elastomeric block copolymer having the general configuration $A\text{-}(B\text{-}A)_{1-5}$ wherein, prior to hydrogenation, each A is a styrene polymer block and each B is a conjugated diene polymer block of a diene taken from the group consisting of butadiene and isoprene, and only said diene block(s) are hydrogenated, said copolymer having a molecular weight in the range of about 70,000 to 150,000, and 5 to 17 parts carbon black.

* * * * *